United States Patent
Trebble (10) Patent No.: US 6,516,631 B1
(45) Date of Patent: Feb. 11, 2003

(54) HYDROCARBON GAS PROCESSING

(76) Inventor: Mark A. Trebble, Box 28, Site 10, R.R. 1, Priddis (CA), T0L 1W0

( * ) Notice: Subject to any disclaimer, the term of this patent is extended or adjusted under 35 U.S.C. 154(b) by 0 days.

(21) Appl. No.: 09/682,268

(22) Filed: Aug. 10, 2001

(51) Int. Cl.[7] .................................................. F25J 3/00
(52) U.S. Cl. ............................................. 62/630; 62/631
(58) Field of Search ................................... 62/630, 631

(56) References Cited

U.S. PATENT DOCUMENTS

| | | | | |
|---|---|---|---|---|
| 2,769,321 A | * | 11/1956 | Stiles | 62/61 |
| 2,777,305 A | * | 1/1957 | Davison | 62/631 |
| 3,313,724 A | * | 4/1967 | Kniel | 62/631 |
| 3,555,837 A | * | 1/1971 | McClintock | 62/630 |
| 4,759,786 A | * | 7/1988 | Atkinson et al. | 62/631 |
| 6,182,469 B1 | | 2/2001 | Campbell et al. | |

OTHER PUBLICATIONS

Hudson, et al.; "Reducing Treating Requirements for Cryogenic NGL Recovery Plants" 80th Annual GPA Convention—Mar. 12, 2001—San Antonio, Texas.

* cited by examiner

Primary Examiner—Ronald Capossela
(74) Attorney, Agent, or Firm—Bennett Jones LLP (57) ABSTRACT

A cryogenic natural gas liquids recovery process which includes the use of a demethanizer and a deethanizer includes a step of recycling a portion of the deethanizer overhead to the demethanizer.

9 Claims, 4 Drawing Sheets

HYDROCARBON GAS PROCESSING

BACKGROUND OF INVENTION

The present invention relates to methods of processing hydrocarbon gases. In particular, it relates to methods of limiting the carbon dioxide content of liquids produced from natural gas liquids recovery processes.

Ethylene, ethane, propylene, propane and/or heavier hydrocarbons can be recovered from a variety of gases, such as natural gas, refinery gas, and synthetic gas streams obtained from other hydrocarbon materials such as coal, crude oil, naphtha, oil shale, tar sands, and lignite. Natural gas usually has a major proportion of methane and ethane, usually in excess of 50 mole percent of the gas. The gas also contains relatively lesser amounts of heavier hydrocarbons such as propane, butanes, pentanes and the like, as well as hydrogen, nitrogen, carbon dioxide and other gases. The present invention is generally concerned with the recovery of ethylene, ethane, propylene, propane and heavier hydrocarbons from such gas streams. A typical analysis of a gas stream to be processed in accordance with this invention would be, in approximate mole percent, 92.5% methane, 4.0% ethane and other $C_2$ components, 1.0% propane and other $C_3$ components, 0.20% iso-butane, 0.20% normal butane, 0.10% pentanes plus, with the balance made up of nitrogen and carbon dioxide. Sulfur-containing gases are also sometimes present. The historically cyclic fluctuations in the prices of both natural gas and its natural gas liquid (NGL) constituents have at times reduced the incremental value of ethane, ethylene, propane, propylene, and heavier components as liquid products. Competition for processing rights has forced plant operators to maximize the processing capacity and recovery efficiency of their existing gas processing plants. Available processes for separating these materials include those based upon cooling and refrigeration of gas, oil absorption, and refrigerated oil absorption. Additionally, cryogenic processes have become popular because of the availability of economical equipment that produces power while simultaneously expanding and extracting heat from the gas stream being processed. Depending upon the pressure of the gas source, the richness (ethane, ethylene, and heavier hydrocarbons content) of the gas, and the desired end products, each of these processes or a combination thereof may be employed. The cryogenic expansion process is now generally preferred for natural gas liquids recovery because it provides maximum simplicity with ease of start up, operating flexibility, good efficiency, safety, and good reliability. U.S. Pat. Nos. 4,157,904; 4,171,964; 4,185,978; 4,251,249; 4,278,457; 4,519,824; 4,617,039; 4,687,499; 4,689,063; 4,690,702; 4,854,955; 4,869,740; 4,889,545; 5,275,005; 5,555,748; 5,568,737; 5,771,712; 5,799,507; 5,881,569; 5,890,378; reissue 32141-60/110,502 U.S. Pat. Nos. 33,408; and U.S. Pat. No. 5,983,664 describe relevant processes which are well known in the art. In a typical cryogenic expansion recovery process, a feed gas stream under pressure is cooled by heat exchange with other streams of the process and/or external sources of refrigeration such as a propane compression-refrigeration system. As the gas is cooled, liquids may be condensed and collected in one or more separators as high-pressure liquids containing some of the desired $C_2$ and heavier components. Depending on the richness of the gas and the amount of liquids formed, the high-pressure liquids may be expanded to a lower pressure and fractionated. The vaporization occurring during expansion of the liquids results in further cooling of the stream. Under some conditions, pre-cooling the high pressure liquids prior to the expansion may be desirable in order to further lower the temperature resulting from the expansion. The expanded stream, comprising a mixture of liquid and vapor, is fractionated in a distillation (demethanizer) column. In the column, the expanded cooled stream(s) is (are) distilled to separate residual methane, nitrogen, and other volatile gases as overhead vapor from the desired $C_2$ components, $C_3$ components, and heavier hydrocarbon components as bottom liquid product. If the feed gas is not totally condensed (typically it is not), at least a portion of the vapor remaining from the partial condensation can be passed through a work expansion machine or engine, or an expansion valve, to a lower pressure at which additional liquids are condensed as a result of further cooling of the stream. The pressure after expansion is essentially the same as the pressure at which the distillation column is operated. The combined vapor-liquid phases resulting from the expansion are supplied as a feed to the column. In recent years, the preferred processes for hydrocarbon separation involve feeding this expanded vapor-liquid stream at a mid-column feed point, with an upper absorber section providing additional rectification of the vapor phase. The source of the reflux stream for the upper rectification section is typically a portion of the above mentioned vapor remaining after partial condensation of the feed gas, but withdrawn prior to work expansion. An alternate source for the upper reflux stream may be provided by a recycled stream of residue gas supplied under pressure. Regardless of its source, this vapor stream is usually cooled to substantial condensation by heat exchange with other process streams, e.g., the cold demethanizer tower overhead. Some or all of the high-pressure liquid resulting from partial condensation of the feed gas may be combined with this vapor stream prior to cooling. The resulting substantially condensed stream is then expanded through an appropriate expansion device, such as an expansion valve, to the pressure at which the demethanizer is operated. During expansion, a portion of the liquid will usually vaporize, resulting in cooling of the total stream. The flash expanded stream is then supplied as top feed to the demethanizer. Alternatively, the cooled and expanded stream may be supplied to a separator to provide vapor and liquid streams, so that thereafter the vapor is combined with the demethanizer tower overhead and the liquid is supplied to the column as a top column feed. In liquid recovery facilities of the type described here, the bottom product leaving the demethanizer comprising primarily of $C_2$ and heavier components along with carbon dioxide and methane components may be sent to subsequent fractionation towers. The first such fractionator is a deethanizer in which substantially all the $C_2$, carbon dioxide and methane components are separated as a top product and the substantially all the $C_3$ and heavier components are produced as a bottom productThe purpose of the overall plant is to produce residue gas leaving the process which contains substantially all of the methane in the feed gas with essentially none of the $C_2$ components and heavier hydrocarbon components, an ethane liquid product leaving the deethanizer overhead which contains substantially all of the $C_2$ components while meeting plant specifications for maximum permissible methane and carbon dioxide content, and a bottoms liquid stream leaving the deethanizer containing the $C_3$ and heavier hydrocarbon components with essentially no ethane or more volatile components.

The present invention provides a means for providing a new plant or modifying an existing processing plant to achieve this separation at significantly lower capital cost by reducing the size of or eliminating the need for a product treating system for removal of carbon dioxide from the $C_2$ stream.

In U.S. Pat. No. 6,182,469, the contents of which are incorporated herein by reference, a method of processing hydrocarbon gas is disclosed which increases carbon dioxide rejection in a cryogenic NGL gas recovery process. Essentially, a heat input (reboiling) is provided higher in the main distillation column (the demethanizer) which rejects more carbon dioxide into the residue gas. However, this solution requires a reconfiguration of the trays inside the demethanizer to retrofit an existing gas processing plant. In some cases, a new side heat exchanger may be required in a retrofit.

Therefore, there is a need in the art for alternative or improved methods of controlling carbon dioxide in a cryogenic gas processing process.

SUMMARY OF INVENTION

In a typical cryogenic expansion recovery process, the bottom stream from the demethanizer is typically sent for fractionation in a deethanizer where the ethane (C2), carbon dioxide and lighter components are separated from the propane and heavier (C3+) components. The overhead of the deethanizer is typically configured with a condenser which takes all of the C2, carbon dioxide and lighter components as a vapor from the deethanizer and completely condenses it to make a liquid product comprising primarily of C2 and smaller amounts of carbon dioxide and lighter components. The current invention does not condense all the vapour leaving the deethanizer overhead but a portion of the vapour is recycled back to an upstream point, typically directly into an upper portion of the demethanizer column. This recycle vapor stream is always richer in methane and carbon dioxide than the liquid ethane product stream, which allows the liquid ethane product stream to be lower in carbon dioxide and methane even though the liquid stream leaving the bottom of the demethanizer may have excessive amounts of methane and carbon dioxide. The amount of vapor recycle is directly controllable by raising or lowering the cooling to the overhead stream from the deethanizer thereby controlling the degree of condensing of the vapor stream leaving the deethanizer.

Therefore, in one aspect, the invention comprises an improvement to a cryogenic natural gas liquid extraction process wherein a gas stream comprising methane, carbon dioxide, $C_2$ components and heavier hydrocarbons is first separated in a demethanizer into a volatile fraction comprising primarily methane and a relatively less volatile fraction comprising $C_2$, carbon dioxide and heavier hydrocarbon components; and wherein the less volatile fraction is then separated in a deethanizer into a fraction comprising primarily $C_2$ components and a fraction comprising heavier hydrocarbon components; wherein the improvement comprises the step of recycling a portion of the $C_2$ fraction as a vapour to the demethanizer or alternatively to any point upstream of the demethanizer.

In another aspect, the invention comprises an improvement to a cryogenic natural gas liquid extraction process wherein a gas stream comprising methane, carbon dioxide, $C_2$ components and heavier hydrocarbons is separated into a volatile fraction comprising primarily methane and a relatively less volatile fraction comprising $C_2$ components and heavier hydrocarbon components, in which process: (a) said gas stream is treated in a processing facility containing heat exchange and expansion devices typical to the cryogenic liquid extraction industry and is fed in a number of split streams to a demethanizer in which substantially all of the methane and lighter gases leave as a top product and substantially all of the $C_2$ and heavier components leave as a bottom product.

(b) the relatively less volatile fraction leaving the bottom of the demethanizer is fractionated in a deethanizer to separate the relatively less volatile fraction into a fraction comprising primarily of hydrocarbons heavier than $C_2$ components and a $C_2$ product stream which contains essentially all of the methane and carbon dioxide which leave the bottom of the demethanizer; (c) the vapour leaving the top of the deethanizer is partially condensed to form a liquid $C_2$ product stream; wherein the improvement comprises the step of recycling all or a portion of the uncondensed vapour portion of the deethanizer overhead back to the demethanizer or to any point in the process upstream of the demethanizer.

BRIEF DESCRIPTION OF DRAWINGS

The invention will now be described by way of an exemplary embodiment with reference to the accompanying drawings. In the drawings.

DETAILED DESCRIPTION

In the following explanation of the above figures, tables are provided summarizing flow rates calculated for representative process conditions. In the tables appearing herein, the values for flow rates (in pound moles per hour) have been rounded to the nearest whole number for convenience. Temperatures indicated (in degrees Fahrenheit) are approximate values rounded to the nearest degree while pressures are indicated in pounds per square inch absolute (psia). It should also be noted that the process design calculations performed for the purpose of comparing the processes depicted in the figures are based on the assumption of no heat transfer from (or to) the surroundings to (or from) the process. The quality of commercially available insulating materials makes this a very reasonable assumption and one that is typically made by those skilled in the art. The terms "$C_2$" or $C_2$" refer to organic compounds having 2 carbon atoms, such as ethane. Likewise, the terms "$C_3$" or "$C_3$" refer to organic compounds having 3 carbon atoms, such as propane.

Figure 1:
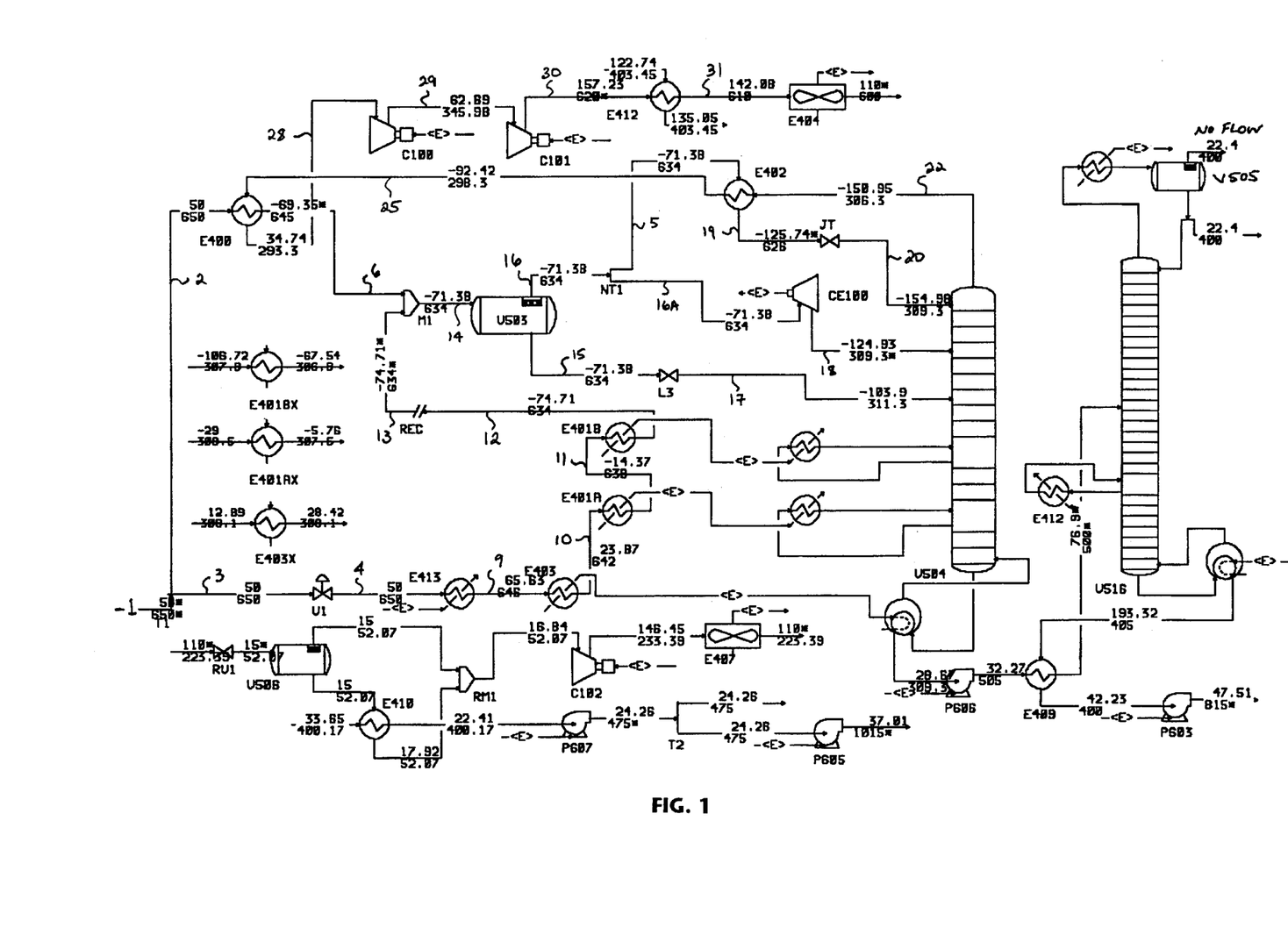
FIG. 1 is a flow diagram of a prior art cryogenic natural gas processing scheme.
Figure 2:
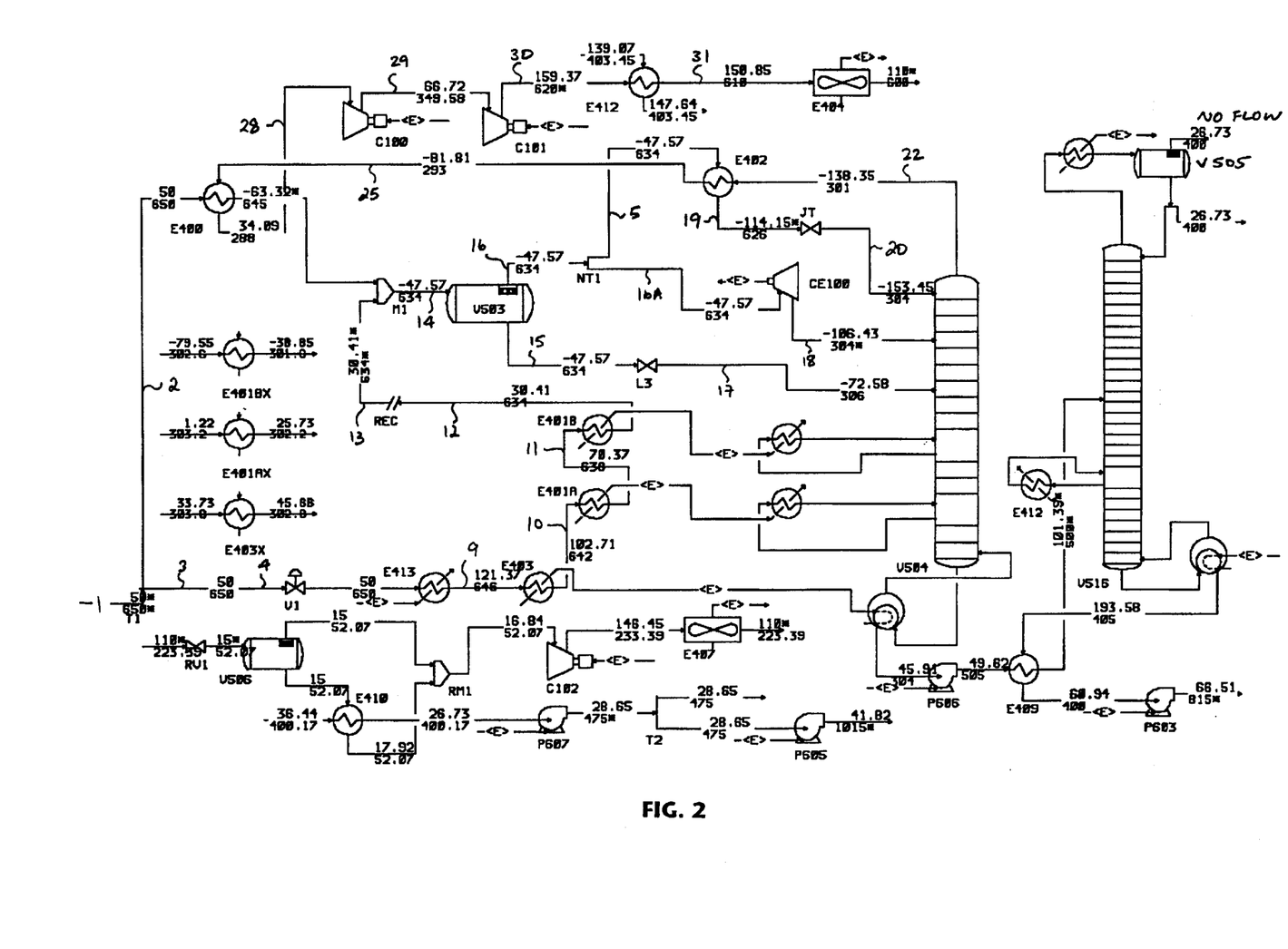
FIG. 2 is a flow diagram of an alternative adaptation of a prior art cryogenic natural gas scheme.

Description of the prior art FIGS. 1 and 2 illustrate prior art cryogenic natural gas liquids recovery processes, to which the present invention may be applied. FIG. 1 is a process flow diagram showing the design of a processing plant to recover C2 components from natural gas using prior art. The demethanizer for this plant is shown as a single column (an absorber section on top and a fractionation section on the bottom) but it is sometimes constructed as two separate sections in larger installations. In this simulation of the process, 1000 MMscfd (million standard cubic feed per day) of inlet gas enters the plant at 50° F. and 650 psia as stream 1. If the inlet gas contains a concentration of sulfur compounds which would prevent the product streams from meeting specifications, the sulfur compounds are removed by appropriate pretreatment of the feed gas (not illustrated) as is well known in the art. In addition, the feed stream is usually dehydrated to prevent hydrate (ice) formation under cryogenic conditions. Solid desiccant may typically be used for this purpose. The feed stream 1 is split into streams 2 and 3. Stream 2 is subsequently cooled to 69° F. in exchanger E400 by heat exchange with cool residue gas at 92° F. (stream 25). Stream 3 is used to reboil the demethanizer and is cooled as a result. Inlet stream 3 may be preheated in exchanger E413 if it is not sufficiently hot to achieve the desired temperature in the bottom of the demethanizer (V504). The preheated stream 9 then enters the reboilers E404, E401A and E401B where it is cooled to a temperature of −75° F. The two cooled inlet streams (6 and 12) are then recombined into stream 14 which enters the cold separator (V503) at a mixed temperature of 71° F. and a pressure of 634 psia. Note that the conventional technology in this field allows for a multiplicity of configurations to cross exchange energy between streams in the process and FIG. 1 is simply an example of a typical configuration. The liquid stream exiting the cold separator (stream 15) is depressurized across level control valve L3 to the same pressure as the demethanizer and is then sent directly to the demethanizer at a mid-column feed point. It is recognized that the prior art contains a number of alternate configurations in which this stream (15) may be used for cooling inlet streams prior to being fed to the demethanizer or in one alternative, it may be recombined with stream 5, cooled, and subsequently used as a portion of the reflux in the absorption section of the demethanizer. The vapor (stream 16) from the cold separator (V503) is divided into two streams, 5 and 16A. Stream 5, containing about 20 percent of the feed to the cold separator, is cooled to 126° F. in exchanger E402 using the overhead stream from the demethanizer. The resulting cooled stream (19) is then depressurized to the demethanizer pressure (306 psia) which results in the partial (25.5%) vaporization of the stream and a resultant drop in the temperature of stream 20 to a value of about −155° F. Stream 20 is subsequently fed to the demethanizer as a top tray reflux. The remaining vapor from the cold separator (stream 16A) enters a work expansion machine CE100 in which mechanical energy is extracted from this portion of the high pressure feed. The expansion machine expands the vapor substantially isentropically from a pressure of about 634 psia to a pressure of about 309 psia, with the work expansion cooling the expanded stream 18 to a temperature of approximately 125° F. The typical commercially available expanders are capable of recovering on the order of 80–85% of the work theoretically available in an ideal isentropic expansion. The work recovered is often used to drive a centrifugal compressor (shown as C100), that is typically used to re-compress the residue gas (stream 28). The expanded and partially condensed stream 18 is supplied as feed to the distillation column at a lower feed point, at theoretical stage 4 in this example. The demethanizer (V504) is a conventional distillation column containing a plurality of vertically spaced trays, one or more packed beds, or some combination of trays and packing. As is often the case in natural gas processing plants, the distillation column may consist of two sections. The upper section of V504 is often a larger diameter than the bottom section of the column to allow for the large amount of vapor fed to the column in stream 18. The smaller diameter section of the demethanizer below the expander feed point typically includes reboilers which heat and vaporize portions of the liquids flowing down the column to provide the stripping vapors which flow up the column. The liquid stream (21) exits the bottom of the demethanizer at 29° F. and is subsequently pumped to a pressure of 505 psia in P606. The higher pressure liquid stream (50) may then be cross exchanged against the liquid C3+ product (stream 54) leaving the bottom of the deethanizer (V516) in heat exchanger E409. This cross exchange leads to slightly better energy efficiency in the overall plant and a reduced energy requirement in the deethanizer bottom reboiler (E411) and it is a standard process configuration used by those skilled in the art. The heated demethanizer bottoms (stream 51) is then fed to a deethanizer (V516). The deethanizer separates the ethane, $CO_2$ and lighter components from C3 and heavier components. The overhead from the deethanizer typically operates at a pressure of 400 psia and 22° F. For the example considered here the ethane recovery for the process is 84.73% but the $CO_2$ content of the produced ethane stream (*C2PROD) is 10.1%, which may be higher than the amount allowed or desired by some typical industrial specifications. The methane content of the ethane product in this example is 2.49% which is the typical industrial specification. The bottom product from the deethanizer (stream 54) contains approximately 2% ethane and the balance comprising of C3 and heavier components recovered from the inlet gas. The deethanizer bottom stream (54) leaves at about 193° F. and is used to preheat the deethanizer feed stream in exchanger E409. The C3+ (stream *C3PROD) is subsequently pumped up to pipeline pressure in P603 and is sent from the plant as a liquid product (stream C3PIPE). Reboiling for the bottom reboiler of the deethanizer (E411) is typically supplied from a steam or hot oil heating system although it may also be supplied from a direct fired heater.

Residue gas from the demethanizer (stream 22) is used to cool the reflux stream (5) and is then used to cool the inlet gas (stream 2). The heated residue gas (stream 28) is then compressed in the brake compressor (C100) which utilizes the power generated in the expansion device (CE100) to raise the pressure of the gas to 346 psia (stream 29). A larger recompressor (C101) is then used to increase the pressure of stream 29 to a higher pressure which varies depending on the final destination of the gas (in this example the recompressor discharges stream 30 at a temperature of 157° F. and a pressure of 620 psia). The hot gas from the recompressor may be used to provide reboiling energy to the deethanizer as shown in this example with exchanger E412. The recompressor discharge stream (30) provides 15.0 MMbtu/hr of heat to the deethanizer side reboiler (E412) which cools the residue stream to 142° F. Additional cooling of the recompressor discharge stream may also be required depending on the nature of the downstream operations. In this example the residue gas leaving the deethanizer side reboiler is cooled in an air cooler (E404) to a temperature of 110° F.

A summary of stream flow rates and conditions for the process illustrated in FIG. 1 is below.

TABLE 1

(FIG. 1)
Stream Flow Summary (Flow in Lb. Moles/Hr)

| Stream | Methane | Ethane | Propane | C4+ | N2 | CO2 | Total | T(° F.) | P(PSI) |
|---|---|---|---|---|---|---|---|---|---|
| 1 | 101569 | 4392 | 1098 | 549 | 1098 | 1098 | 109804 | 50 | 650 |
| 2 | 79123 | 3422 | 855 | 428 | 855 | 855 | 85538 | 50 | 650 |
| 3 | 22446 | 970 | 243 | 121 | 243 | 243 | 24266 | 50 | 650 |
| 5 | 25595 | 1038 | 210 | 59 | 279 | 271 | 27451 | −71 | 634 |
| 14 | 101569 | 4392 | 1098 | 549 | 1098 | 1098 | 109804 | −71 | 634 |
| 15 | 1074 | 318 | 272 | 319 | 3 | 35 | 2021 | −71 | 634 |
| 16 | 100495 | 4074 | 826 | 230 | 1095 | 1063 | 107783 | −71 | 634 |
| 17 | 1074 | 318 | 272 | 319 | 3 | 35 | 2021 | −104 | 311 |
| 18 | 74900 | 3037 | 616 | 171 | 816 | 792 | 80332 | −125 | 309 |
| 19 | 25595 | 1038 | 210 | 59 | 279 | 271 | 27451 | −126 | 626 |
| 20 | 25595 | 1038 | 210 | 59 | 279 | 271 | 27451 | −155 | 309 |
| 21 | 106 | 3722 | 1086 | 548 | 0 | 429 | 5891 | 29 | 309 |
| 22 | 101464 | 671 | 12 | 1 | 1098 | 669 | 103914 | −151 | 306 |
| *RES | 101464 | 671 | 12 | 1 | 1098 | 669 | 103914 | 110 | 600 |
| *C2PROD | 106 | 3699 | 11 | 0 | 0 | 429 | 4245 | 22 | 400 |
| *C3PROD | 0 | 22 | 1075 | 548 | 0 | 0 | 1646 | 42 | 400 |

Recoveries:
Ethane 84.73%
Propane 98.87%
C4+ 99.89%
Residue Compression = 31295 HP As shown in Table 1, the prior art illustrated in FIG. 1 achieves 84.73% ethane recovery using the available residue compression horsepower (31500 HP maximum). However, the carbon dioxide concentration in the ethane product (the methane, ethane, and carbon dioxide stream that results when the bottoms liquid product is subsequently fractionated to separate the $C_2$, $CO_2$ and lighter components from the $C_3$ components and heavier hydrocarbon components) is 10.11 mole percent, which may exceed a typical plant owner's specification of maximum 6.0 mole percent in the C2 product which is the specification for plants in Alberta delivering into the Alberta Ethane Gathering System. Other plants in North America may have different specifications. Thus, this plant design would require the addition of a treating system to remove carbon dioxide from the hydrocarbons in order to produce a marketable liquid product. There are many options for removing the carbon dioxide (treating the incoming feed gas, treating the total liquid product, treating the ethane product after fractionation, etc.), but all of these options will add not only to the capital cost of the plant due to the cost of installing the treating system, but also to the operating expense of the plant due to energy and/or chemical consumption in the treating system. One way to keep the ethane product within the carbon dioxide specification is to operate the demethanizer in a manner to strip the carbon dioxide from the bottom liquid product, by adding more reboil heat to the column using the reboiler stream preheater (E413) or any other type of heat addition to the demethanizer bottoms in alternate configurations. FIG. 2 represents such an alternative operating scheme for the process depicted in FIG. 1. The process of FIG. 2 has been applied to the same feed gas composition and conditions as described above for FIG. 1. However, in the simulation of the process of FIG. 2 the process operating conditions have been adjusted to control the bottom temperature of the demethanizer (V504) such that the carbon dioxide content of the ethane product is within specification of 6.0% of $CO_2$ in the $C_2$ product stream. In the simulation of this process, as in the simulation for the process of FIG. 1, operating conditions were selected to keep the ethane recovery level as high as possible without exceeding the available residue gas compression horsepower. The feed stream 1 is split into streams 2 and 3. Stream 2 is subsequently cooled to 63° F. in exchanger E400 by heat exchange with cool residue gas at 82° F. (stream 25). Stream 3 is used to reboil the demethanizer and is cooled as a result. Inlet stream 3 is preheated to 121° F. in exchanger E413 and is subsequently used to provide heat input to the three demethanizer reboilers, E403, E401A and E401B. This preheating requires an addition of 17,900,000 Btu/hr in exchanger E413 which represents a substantial incremental cost of operating in this manner. The resultant inlet stream (12) at 30° F. is mixed with the exit stream from E400 and the combined stream at 48° F. is sent to the cold separator (V503) where the vapor (stream 16) is separated from the condensed liquid (stream 15). The vapor (stream 16) from the cold separator (V503) is divided into two streams, 5 and 16A. Stream 5, containing about 20 percent of the feed to the cold separator is chilled in exchanger E402 to a temperature of 114° F. (stream 19). Stream 19 is then depressurized to the demethanizer pressure (304 psia) and is sent to the demethanizer as top reflux. The balance of the vapor (stream 16A) from the cold separator (V503) is expanded through CE100 to a temperature of 106° F. and a pressure of 304 psia and is then sent to the demethanizer on the fourth theoretical stage. The liquids from the cold separator (stream 15) are depressurized to the demethanizer pressure through level control valve L3 and are then sent to the demethanizer as a side feed as in the previous example.

The demethanizer (V504) is a conventional distillation column containing a plurality of vertically spaced trays, one or more packed beds, or some combination of trays and packing. As is often the case in natural gas processing plants, the distillation column may consist of two sections. The upper section of V504 is often a larger diameter than the bottom section of the column to allow for the large amount of vapor fed to the column in stream 18. The smaller diameter section of the demethanizer below the expander feed point typically includes reboilers which heat and vaporize portions of the liquids flowing down the column to provide the stripping vapors which flow up the column. The liquid stream (21) exits the bottom of the demethanizer at 46 F. for this example due to the higher amount of reboiling heating required to reduce the carbon dioxide content down to the specification value of 6.0%. Stream 21 is subsequently pumped to a pressure of 505 psia in P606 and is then cross exchanged against the liquid C3+ product leaving the bottom of the deethanizer (V516) in heat exchanger E409. This cross exchange leads to slightly better energy efficiency in the overall plant and a reduced energy requirement in the deethanizer bottom reboiler (E411) and it is a standard process configuration used by those skilled in the art. The heated demethanizer bottoms (stream 51) is then fed to a deethanizer (V516). The deethanizer separates the ethane and lighter components from the propane and heavier components. The overhead from the deethanizer typically operates at a pressure of 400 psia and 27F. For the example considered here the ethane recovery for the process is 51.38% and the carbon dioxide content of the produced ethane stream (*C2PROD) is reduced to 5.99% which is the amount allowed by some typical industrial specifications. The methane content of the ethane product in this example is 2.50% which meets the typical industrial specification. The bottom product from the deethanizer (stream 54 contains approximately 2% ethane and the balance of the C3 and heavier components recovered from the inlet gas. The bottom stream from the deethanizer leaves at about 194 F. and is used to preheat the deethanizer feed stream in exchanger E409. The C3+ (stream *C3PROD) is subsequently pumped up to pipeline pressure in P603 and is sent from the plant as a liquid product (stream C3PIPE). Reboiling for the bottom reboiler of the deethanizer (E411) is typically supplied from a steam or hot oil heating system although it may also be supplied from a direct fired heater.

Residue gas from the demethanizer (stream 22) is used to cool the reflux stream (5) and is then used to cool the inlet gas (stream 2). The heated residue gas (stream 28) is then compressed in the brake compressor (C100) which utilizes the power generated in the expansion device (CE100) to raise the pressure of the gas to 350 psia (stream 29). A larger recompressor (C101) is then used to increase the pressure of stream 29 to a higher pressure which varies depending on the final destination of the gas (in this example the recompressor discharges stream 30 at a temperature of 159 F. and a pressure of 620 psia). The hot gas from the recompressor may be used to provide reboiling energy to the deethanizer as shown in this example with exchanger E412. The recompressor discharge stream (30) provides 8,500,000 btu/hr of heat to the deethanizer side reboiler (E412) which cools the residue stream to 151 F. Additional cooling of the recompressor discharge stream may also be required depending on the nature of the downstream operations. In this example the residue gas leaving the deethanizer side reboiler is cooled in an air cooler (E404) to a temperature of 110 F.

A summary of stream flow rates and conditions for the process illustrated in FIG. 2 is below:

TABLE 2

(FIG. 2)
Stream Flow Summary (Flow in Lb. Moles/Hr)

| Stream | Methane | Ethane | Propane | C4+ | N2 | CO2 | Total | T(° F.) | P(PSI) |
|---|---|---|---|---|---|---|---|---|---|
| 1 | 101569 | 4392 | 1098 | 549 | 1098 | 1098 | 109804 | 50 | 650 |
| 2 | 79123 | 3422 | 855 | 428 | 855 | 855 | 85538 | 50 | 650 |
| 3 | 22446 | 970 | 243 | 121 | 243 | 243 | 24266 | 50 | 650 |
| 5 | 25412 | 1095 | 270 | 126 | 275 | 274 | 27451 | −48 | 634 |
| 14 | 101569 | 4392 | 1098 | 549 | 1098 | 1098 | 109804 | −48 | 634 |
| 15 | 62 | 19 | 20 | 47 | 0 | 2 | 150 | −48 | 634 |
| 16 | 101507 | 4373 | 1078 | 502 | 1098 | 1096 | 109655 | −48 | 634 |
| 17 | 62 | 19 | 20 | 47 | 0 | 2 | 150 | −73 | 306 |
| 18 | 76096 | 3278 | 808 | 376 | 823 | 822 | 82203 | −106 | 304 |
| 19 | 25412 | 1095 | 270 | 126 | 275 | 274 | 2745 | −114 | 626 |
| 20 | 25412 | 1095 | 270 | 126 | 275 | 274 | 27451 | −153 | 304 |
| 21 | 61 | 2257 | 1067 | 547 | 0 | 147 | 4079 | 46 | 304 |
| 22 | 101508 | 2135 | 31 | 2 | 1098 | 951 | 105725 | −138 | 301 |
| *RPS | 101508 | 2135 | 31 | 2 | 1098 | 951 | 105725 | 110 | 600 |
| *C2PROD | 61 | 2235 | 6 | 0 | 0 | 147 | 2449 | 27 | 400 |
| *C3PROD | 0 | 22 | 1061 | 548 | 0 | 0 | 1630 | 61 | 400 |

Recoveries:
Ethane 51.39%
Propane 97.18%
C4+ 99.63%
Residue Compression = 31429 HP The carbon dioxide concentration in the ethane product for the FIG. 2 process is 5.99 mole percent, complying with the plant owner's specification of 6.0 mole percent maximum and the methane content is held to 2.5% which also meets the specification. It is clear from Table 2 that meeting the required CO2 content has a disastrous effect on the recovery of ethane. The FIG. 2 process reduces ethane recovery from 84.73% to 51.39%, propane recovery from 98.87% to 97.18%, and butanes+recovery from 99.89% to 99.63%. There are two factors at work in the FIG. 2 process that result in less liquids recovery from the bottom of the demethanizer (V504). First, when the temperature at the bottom of the demethanizer is raised from 29° F. in the FIG. 1 process to 46° F. in the FIG. 2 process, the temperatures at each point in the column increase relative to their corresponding values in the FIG. 1 process. This reduces the amount of cooling that the tower liquid streams can supply to the feed gas in heat exchangers E403, E401A and E401B. As a result, the cooled feed stream (stream 14) entering the cold separator V503 is warmer (−48° F. for the FIG. 2 process versus 69° F. for the FIG. 1 process), which in turn results in the lower ethane recovery in the demethanizer. Second, the higher temperatures in the top of the demethanizer results in less available cooling for the reflux stream (5) so that the temperature of the inlet reflux stream to the demethanizer (19) increases from 155° F. to 153° F. The reflux stream (20) associated with the FIG. 2 process also contains more liquids. While stream 20 for the FIG. 1 process contains 74% liquids on a molar basis, the FIG. 2 process contains only 56%. This effectively means that substantially less liquids are available for reflux in the FIG. 2 process, which also results in a lower ethane recovery in the demethanizer.

Figure 3:
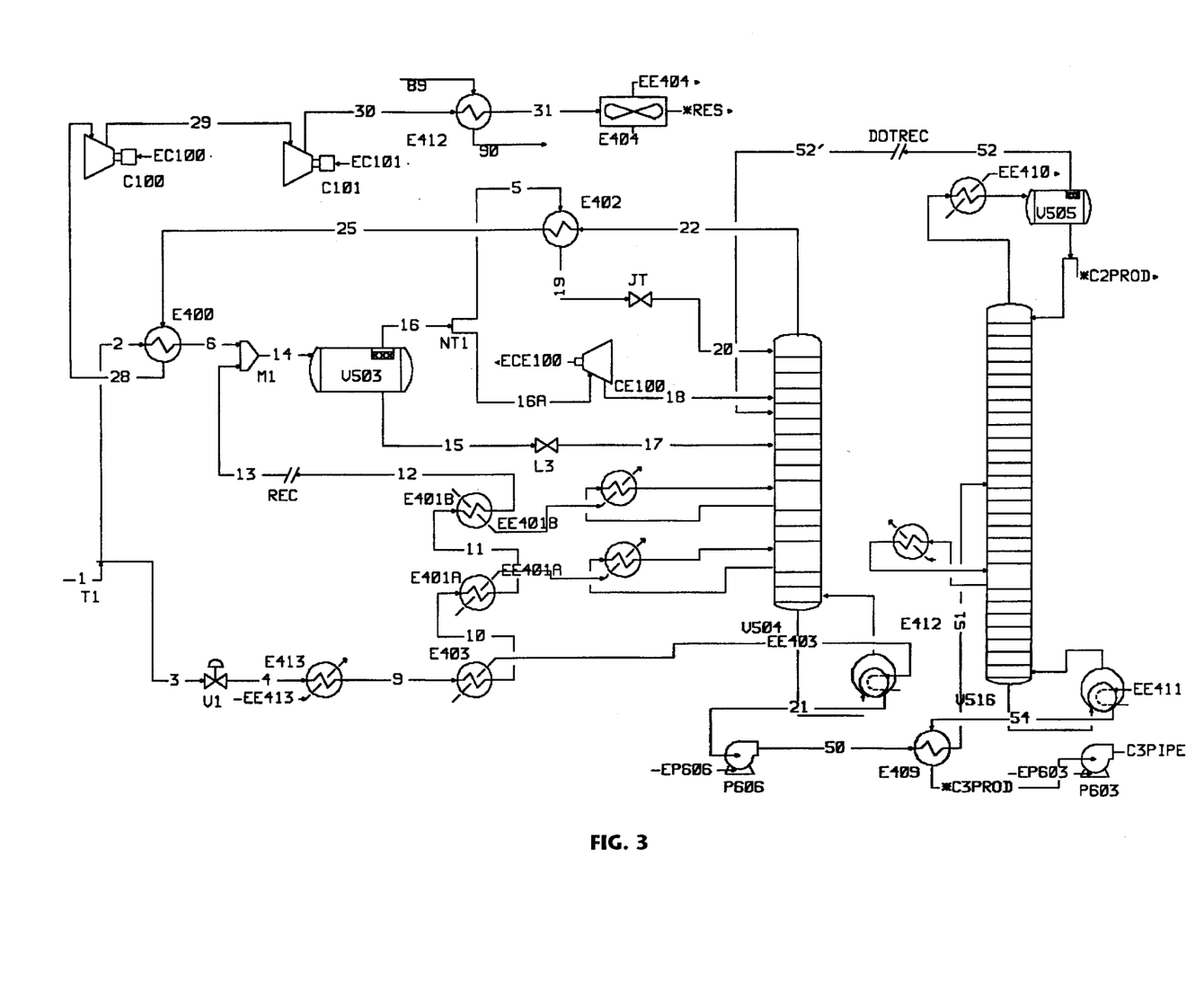
FIG. 3 is a flow diagram of one embodiment of the process of the present invention.
Figure 4:
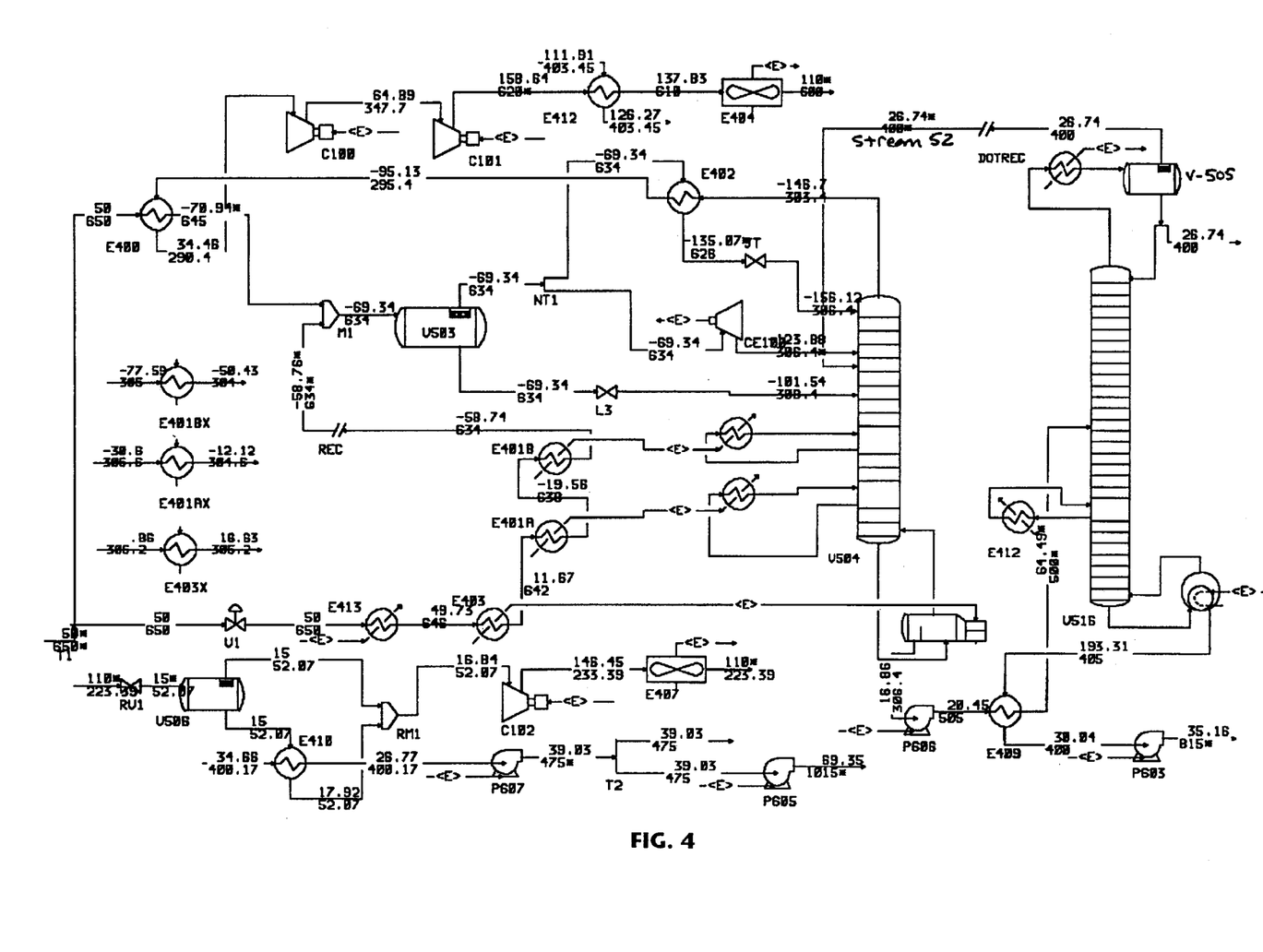
FIG. 4 is a flow diagram of the embodiment shown in FIG. 3, with process temperature and pressure information from one example provided.

Description of the invention FIGS. 3 and 4 illustrate flow diagrams of a process in accordance with the present invention. The feed gas composition and conditions considered in the inventive process are the same as those in prior art FIGS. 1 and 2 and comprises a similar cryogenic expansion recovery process. Accordingly, the FIG. 3/4 process can be compared with that of the FIG. 1 and 2 processes to illustrate the operation of the present invention. The FIG. 3/4 process described below is exemplary of the present invention and is not intended to limit the invention claimed herein. In particular, one skilled in the art will realize that many variations on the demethanizer deethanizer configuration and the various energy exchanges illustrated exist which are compatible with and included within the scope of the claimed invention. In the simulation of the FIG. 3 process, inlet gas (stream 1) enters at 50° F. and a pressure of 650 psia. The feed stream 1 is split into streams 2 and 3. Stream 2 is subsequently cooled to 71° F. in exchanger E400 by heat exchange with cool residue gas at 95° F. (stream 25). Stream 3 is used to reboil the demethanizer and is cooled as a result. The resultant inlet stream (12) at −59° F. is mixed with the exit stream from E400 and the combined stream at 69° F. is sent to the cold separator (V503) where the vapor (stream 16) is separated from the condensed liquid (stream 15). The vapor (stream 16) from the cold separator (V503) is divided into two streams, 5 and 16A. Stream 5, containing about 20 percent of the feed to the cold separator is chilled in exchanger E402 to a temperature of 135° F. (stream 19). Stream 19 is then depressurized to the demethanizer pressure (304 psia) and is sent to the demethanizer as top reflux. The balance of the vapor (stream 16A) from the cold separator (V503) is expanded through CE100 to a temperature of 124° F. and a pressure of 306 psia and is then sent to the demethanizer on the fourth theoretical stage. The liquids from the cold separator (stream 15) are depressurized to demethanizer pressure through level control valve L3 and are then sent to the demethanizer as a side feed as in the previous two examples.

The demethanizer (V504) is a conventional distillation column containing a plurality of vertically spaced trays, one or more packed beds, or some combination of trays and packing. As is often the case in natural gas processing plants, the distillation column may consist of two sections. The upper section of V504 is often a larger diameter than the bottom section of the column to allow for the large amount of vapor fed to the column in stream 18. The smaller diameter section of the demethanizer below the expander feed point typically includes reboilers which heat and vaporize portions of the liquids flowing down the column to provide the stripping vapors which flow up the column. The demethanizer vessel in accordance with the new invention may have an additional feed point as shown on FIG. 3 through which a recycle vapor stream (52) may be sent back from the deethanizer overhead reflux drum (V505). The recycle stream may also be sent to alternate points in the column or may be combined with other column feeds in order to avoid having to add an additional feed nozzle to the demethanizer. In the example illustrated, the recycle stream is added as a feed to the fifth theoretical stage of the demethanizer. The liquid stream (21) exits the bottom of the demethanizer at 17 F. for this example which is lower than in either of the previous two examples. The low temperature of the demethanizer is advantageous since it means that more cooling can be provided to the inlet stream (2) in the side reboilers E403, E401A, and E402B which results in colder temperatures in the cold separator (V503) and in the demethanizer feeds. Additionally, a colder bottoms stream leaving the demethanizer bottoms is advantageous when that stream is used to subcool liquids in a propane refrigeration system (a typical industrial configuration which saves energy in the refrigeration scheme and which is well known to those skilled in the art). The liquid leaving the bottom of the demethanizer (stream 21) would exceed both the methane and the $CO_2$ specification at the colder temperature of 17 F. and could not be sent directly as a final product. Stream 21 is subsequently pumped to a pressure of 505 psia in P606 and is then cross exchanged against the liquid C3+ product leaving the bottom of the deethanizer (V516) in heat exchanger E409. This cross exchange leads to slightly better energy efficiency in the overall plant and a reduced energy requirement in the deethanizer bottom reboiler (E411) and it is a standard process configuration used by those skilled in the art. The heated demethanizer bottoms (stream 51) is then fed to a deethanizer (V516). The deethanizer separates the ethane, carbon dioxide and lighter components from the propane and heavier components. The overhead from the deethanizer typically operates at a pressure of 400 psia and 27° F. For the example considered here the ethane recovery for the process is 73.54% and the $CO_2$ content of the produced ethane stream (*C2PROD) is held at 6.00% which is the amount allowed by some typical industrial specifications. The methane content of the ethane product in this example is 2.50% which also meets typical industrial specification.

The difference in this process which is novel is that a portion of the vapor leaving the top of the deethanizer column (V516) is left uncondensed and is recycled back to the demethanizer. The uncondensed portion of the column overhead (stream 52) contains a relatively high concentration of methane and $CO_2$ compared with the ethane product stream (*C2PROD). In example 3 presented here the recycle stream (52) contains 8.49% C1 and 10.58% $CO_2$. The recycle of this stream allows the ethane product to be stripped of excess methane and $CO_2$ and to meet specification. The flowrate of the recycle stream can be varied easily by increasing or decreasing the amount of cooling provided to the deethanizer overhead condenser (E410). In the example presented here the flowrate of the recycle stream is 18.7 MMscfd which represent 1.87% of the volumetric rate of the inlet flow. This rate can obviously be varied up or down depending on how much methane and $CO_2$ need to be removed from the ethane product in order to meet specification. In one embodiment, the recycle stream for this example at 27° F. and 400 psia is sent to the fifth theoretical stage of the demethanizer where the ethane portion of the recycle stream is recovered although it may be recognized by those skilled in the art that the recycle stream could be sent anywhere back into the upstream process, even to the higher pressure inlet streams if a small compressor is utilized.

In practice, the vapour leaving the top of the deethanizer is partially condensed and sent to an overhead reflux drum (V505). The liquids from the drum are sent as reflux to the deethanizer and as a liquid ethane product. The vapour from the overhead reflux drum, or a portion of it, is the recycle stream (52) which is returned upstream to the demethanizer or upstream of the demethanizer.

In yet another alternate configuration the recycle stream could be burned or utilized as fuel gas, rather than being returned to the demethanizer, although the overall ethane recovered from the process would then be somewhat diminished.

The bottom product from the deethanizer (stream 54) contains approximately 2% ethane and the balance of the heavier components recovered from the inlet gas. The bottom stream leaves at about 193° F. and may be used to preheat the deethanizer feed stream in exchanger E409. The C3+ (stream *C3PROD) is subsequently pumped up to pipeline pressure in P603 and is sent from the plant as a liquid product (stream C3PIPE). Reboiling for the bottom reboiler of the deethanizer (E411) is typically supplied from a steam or hot oil heating system although it may also be supplied from a direct fired heater.

Residue gas from the demethanizer (stream 22) is used to cool the reflux stream (5) and is then used to cool the inlet gas (stream 2). The heated residue gas (stream 28) is then compressed in the brake compressor (C100) which utilizes the power generated in the expansion device (CE100) to raise the pressure of the gas to 348 psia (stream 29). A larger recompressor (C101) is then used to increase the pressure of stream 29 to a higher pressure which varies depending on the final destination of the gas (in this example the recompressor discharges stream 30 at a temperature of 159° F. and a pressure of 620 psia). The hot gas from the recompressor may be used to provide reboiling energy to the deethanizer as shown in this example with exchanger E412. The recompressor discharge stream (30) provides 20.9 MMbtu/hr of heat to the deethanizer side reboiler (E412) which cools the residue stream to 138° F. Additional cooling of the recompressor discharge stream may also be required depending on the nature of the downstream operations. In this example the residue gas leaving the deethanizer side reboiler is cooled in an air cooler (E404) to a temperature of 110° F.

A summary of stream flow rates and conditions for the process illustrated in FIG. 3 is below:

mum and the methane content is held to 2.5% which also meets the specification. Table 3 clearly shows the advantage of the new process which is able to increase the ethane recovery from 51.39% (for the FIG. 2 process) to 73.54%. Propane recovery is also increased from 97.18% to 98.72% and C4+ recovery is increased from 99.63% to 99.88%.

Another advantage of the proposed process (FIG. 3) is that $CO_2$ freezing is lessened by operation. The process depicted in FIG. 1 operates within 9.1° F. of the point at which solid $CO_2$ would form in the demethanizer. The process depicted in FIG. 2 operates within 24.5° F. of the $CO_2$ freezing point since the demethanizer overhead is so much warmer for this case. The process improvement of the present invention, shown in FIG. 3 only approaches the $CO_2$ freezing point to within 11.6° F. even though the demethanizer overhead temperature is very cold (−147° F. compared to 151° F. for the process shown in FIG. 1).

As will be apparent to those skilled in the art, various modifications, adaptations and variations of the foregoing specific disclosure can be made without departing from the scope of the invention defined by the claims appended below.

What is claimed is:

1. In a cryogenic natural gas liquid extraction process wherein a gas stream comprising methane, carbon dioxide, $C_2$ components and heavier hydrocarbons is first separated in a demethanizer into a volatile fraction comprising primarily methane and a relatively less volatile fraction comprising $C_2$, carbon dioxide and heavier hydrocarbon components; and wherein the less volatile fraction is then separated in a deethanizer into a fraction comprising primarily $C_2$ and which may comprise carbon dioxide and a fraction comprising heavier hydrocarbon components, the improvement comprising the step of removing a portion of the $C_2$ fraction as a vapour and recycling the portion back to the demethanizer or to any point upstream of the demethanizer, or otherwise using the portion in a plant implementing this process.

TABLE 3

(FIG. 3)
Stream Flow Summary (Flow in Lb. Moles/Hr)

| Stream | Methane | Ethane | Propane | C4+ | N2 | CO2 | Total | T(° F.) | P(PSI) |
|---|---|---|---|---|---|---|---|---|---|
| 1 | 101569 | 4392 | 1098 | 549 | 1098 | 1098 | 109804 | 50 | 650 |
| 2 | 79833 | 3452 | 863 | 431 | 863 | 863 | 86306 | 50 | 650 |
| 3 | 21736 | 940 | 235 | 118 | 235 | 235 | 23498 | 50 | 650 |
| 5 | 20459 | 837 | 174 | 51 | 223 | 217 | 21961 | −69 | 634 |
| 14 | 101569 | 4392 | 1098 | 549 | 1098 | 1098 | 109804 | −69 | 634 |
| 15 | 910 | 273 | 240 | 299 | 3 | 30 | 1755 | −69 | 634 |
| 16 | 100659 | 4119 | 858 | 250 | 1095 | 1068 | 108049 | −69 | 634 |
| 17 | 910 | 273 | 240 | 299 | 3 | 30 | 1755 | −102 | 308 |
| 18 | 80200 | 3282 | 683 | 199 | 873 | 851 | 86088 | −124 | 306 |
| 19 | 20459 | 837 | 174 | 51 | 223 | 217 | 21961 | −135 | 626 |
| 20 | 20459 | 837 | 174 | 51 | 223 | 217 | 21961 | −156 | 306 |
| 21 | 262 | 4888 | 1086 | 548 | 0 | 428 | 7210 | 17 | 306 |
| 22 | 101482 | 1162 | 14 | 1 | 1098 | 887 | 104644 | −147 | 303 |
| *RES | 101482 | 1162 | 14 | 1 | 1098 | 887 | 104644 | 110 | 600 |
| *C2PROD | 88 | 3208 | 9 | 0 | 0 | 211 | 3515 | 27 | 400 |
| *C3PROD | 0 | 22 | 1075 | 548 | 0 | 0 | 1646 | 30 | 400 |
| 52 | 174 | 1658 | 2 | 0 | 0 | 217 | 2050 | 27 | 400 |

Recoveries:
Ethane 73.54%
Propane 98.72%
C4+ 99.88%
Residue Compression = 31348 HP The carbon dioxide concentration in the ethane product for the FIG. 3 process is 6.00 mole percent, complying with the plant owner's specification of 6.0 mole percent maxi- 2. In a cryogenic natural gas liquid extraction process wherein a gas stream comprising methane, carbon dioxide, $C_2$ components and heavier hydrocarbons is separated into a volatile fraction comprising primarily methane and a relatively less volatile fraction comprising $C_2$, carbon dioxide and heavier hydrocarbon components, in which process:

(a) said gas stream is treated in one or more heat exchange steps and at least one separation step to produce at least a first feed stream that has been cooled under pressure to condense substantially all of it, and at least a second feed stream that has been cooled under pressure;

(b) said substantially condensed first feed stream is supplied to a demethanizer at a mid-column feed point;

(c) said cooled second feed stream is divided into a third feed stream which is expanded and at least partially condensed at temperature colder than the first feed stream, and thereafter supplied to said demethanizer at an upper feed point, and a fourth feed stream which is substantially condensed and provided to the demethanizer as a top reflux;

(d) said first, third and fourth feed streams are fractionated in said demethanizer at said lower pressure to produce the volatile fraction from the top of the demethanizer and the relatively less volatile fraction comprising of primarily $C_2$, carbon dioxide and heavier hydrocarbons which is condensed and recovered from the bottom of the demethanizer;

(e) the relatively less volatile fraction is fractionated in a deethanizer to separate the relatively less volatile fraction into a fraction comprising primarily of $C_3$ and heavier hydrocarbons and a fraction comprising primarily of $C_2$ and which may also comprise carbon dioxide;

the improvement comprising the step of recycling a portion of the deethanizer overhead fraction to the demethanizer, or to any point upstream of the demethanizer.

3. The improvement of claim 1 or claim 2 wherein the process further comprises at least one side reboiling step and the recycled portion of the deethanizer overhead fraction is returned as a vapour to the demethanizer above a reboiler reentry point.

4. The improvement of claim 3 wherein the recycled portion of the deethanizer overhead fraction is returned as a vapour to the demethanizer below the upper feed point.

5. The improvement of claim 4 wherein the recycled portion of the deethanizer overhead fraction is returned as a vapour to the demethanizer at a point immediately below the upper feed point.

6. The improvement of claim 3 wherein the recycled portion of the deethanizer overhead fraction is compressed to a higher pressure and treated in one or more heat exchange steps and expanded to the same pressure as the demethanizer tower and returned to the demethanizer tower.

7. The improvement of claim 3 wherein the recycled portion of the deethanizer overhead fraction is returned as a vapour to the demethanizer tower by combining the recycled portion of the deethanizer overhead fraction with the said second feed stream.

8. The improvement of claim 3 wherein the proportion of the deethanizer overhead fraction which is recycled to the demethanizer is varied by varying the amount of cooling performed in a deetanizer overhead condenser.

9. The improvement according to claim 1 or 2 wherein the recycled portion of the $C_2$ product stream is not recycled but is otherwise utilized in the process.

* * * * *